(12) United States Patent
Planta Torralba et al.

(10) Patent No.: US 9,327,455 B2
(45) Date of Patent: May 3, 2016

(54) METHOD FOR PRODUCING AIR DUCTS FROM PLASTIC MATERIAL, AND MOULD USED

(75) Inventors: Francisco Javier Planta Torralba, Barcelona (ES); Jose Manuel Navarro Robles, Barcelona (ES)

(73) Assignees: Fundacio Privada Ascamm, Barcelona (ES); Sogefi Filtration, S.A., Barcelona (ES)

( * ) Notice: Subject to any disclaimer, the term of this patent is extended or adjusted under 35 U.S.C. 154(b) by 180 days.

(21) Appl. No.: 14/237,179

(22) PCT Filed: Aug. 2, 2012

(86) PCT No.: PCT/ES2012/070601
§ 371 (c)(1),
(2), (4) Date: May 13, 2014

(87) PCT Pub. No.: WO2013/021083
PCT Pub. Date: Feb. 14, 2013

(65) Prior Publication Data
US 2014/0246814 A1  Sep. 4, 2014

(30) Foreign Application Priority Data

Aug. 5, 2011 (ES) .................................. 201131365

(51) Int. Cl.
| | |
|---|---|
| B29C 69/02 | (2006.01) |
| B29C 49/20 | (2006.01) |
| B29C 45/16 | (2006.01) |
| B29C 45/26 | (2006.01) |
| B29C 49/48 | (2006.01) |
| B29L 31/24 | (2006.01) |
| B29L 23/00 | (2006.01) |
| B29C 49/04 | (2006.01) |
| B29C 49/50 | (2006.01) |

(52) U.S. Cl.
CPC .............. *B29C 69/02* (2013.01); *B29C 45/162* (2013.01); *B29C 45/261* (2013.01); *B29C 49/20* (2013.01); *B29C 49/48* (2013.01); *B29C 2049/047* (2013.01); *B29C 2049/2017* (2013.01); *B29C 2049/2047* (2013.01); *B29C 2049/503* (2013.01); *B29C 2793/0018* (2013.01); *B29L 2023/004* (2013.01); *B29L 2023/22* (2013.01); *B29L 2031/246* (2013.01)

(58) Field of Classification Search
None
See application file for complete search history.

(56) References Cited

U.S. PATENT DOCUMENTS

| | | | | |
|---|---|---|---|---|
| 4,142,528 A * | 3/1979 | Whelan, Jr. | ....... | A61M 39/0247 604/284 |
| 5,198,174 A * | 3/1993 | Nakagawa | .......... | B29C 33/0033 264/512 |
| 5,266,262 A | 11/1993 | Narayama | | |
| 6,146,364 A * | 11/2000 | Kawano | ................ | A61M 39/10 604/284 |
| 6,439,615 B1 * | 8/2002 | Selby | ...................... | F16L 41/03 285/125.1 |
| 6,793,870 B1 | 9/2004 | Brodesser | | |

FOREIGN PATENT DOCUMENTS

| | | |
|---|---|---|
| ES | 2104846 | 10/1997 |
| JP | 8197615 | 8/1996 |
| WO | 8904755 | 6/1989 |

* cited by examiner

*Primary Examiner* — Monica Huson
(74) *Attorney, Agent, or Firm* — Sturm & Fix LLP

(57) ABSTRACT

Method and mold for producing air ducts (P) from plastic material, especially soft plastic material, with a hardness of between Shore 5 and Shore 65, of the type comprising a hollow main body (P1) provided with at least one protuberance or nipple (P2) that projects from the exterior wall of the main body (P1), the method comprising the steps of injection-molding at least one nipple (P2) from plastic material inside a first cavity (1) of a mold (M); interconnecting the first cavity (1) with a second cavity (3) arranged in the same mold (M) and located adjacent to said first cavity (1), in order to form a single volume; and blow-molding a hollow body from a moldable plastic-material parison inside the second cavity (3).

3 Claims, 3 Drawing Sheets

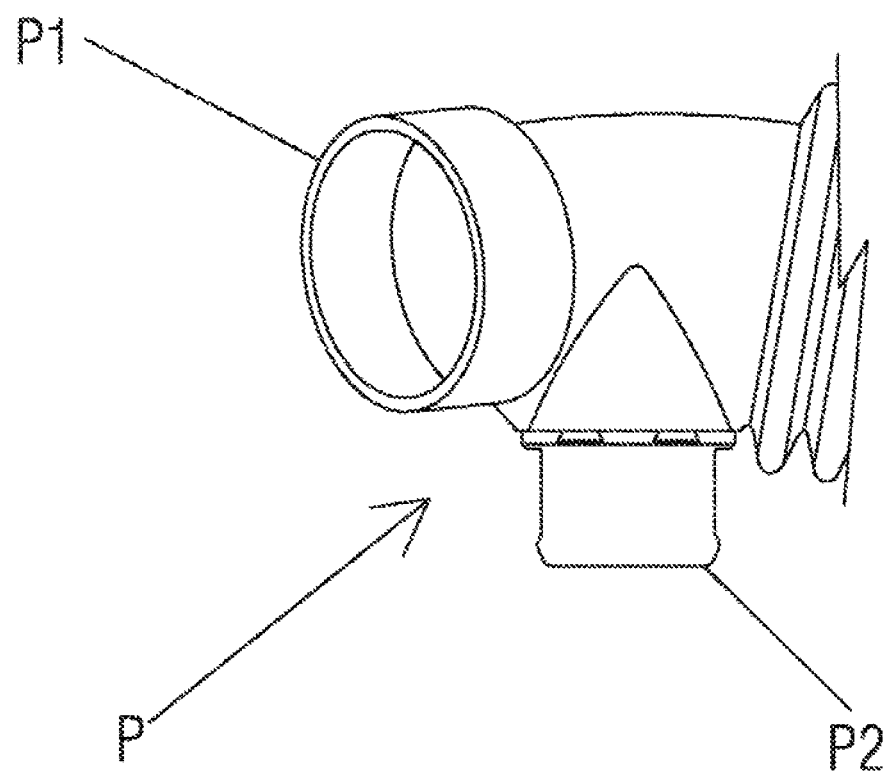

METHOD FOR PRODUCING AIR DUCTS FROM PLASTIC MATERIAL, AND MOULD USED

OBJECT OF THE INVENTION

The purpose of the invention patent application herein is to register a method and mould for producing air ducts from plastic material that incorporates significant innovations and advantages.

More specifically, the invention proposes the development of a new method for producing air ducts from plastic material, especially soft plastic material, with a hardness of between Shore 5 and Shore 65, of the type having at least a second geometry or connector coupled to the main body, used especially in the automotive industry, in order to optimise manufacturing times and costs.

BACKGROUND OF THE INVENTION

In the air duct sector, and in particular in respect of their use in the automotive industry, the parts used for channelling air are known, said parts being formed by a hollow main body which has one or several coupler nozzles between its two ends, also called nipples, in order to branch the main duct for connection to other devices or pipes, said nipples being joined and connected to the main body.

The manufacture of parts from plastic material consisting of an internally hollow body and additional peripheral parts attached thereto is well known, such as for example, piping tubes, tanks or other enclosed hollow element that usually forms part of a motor vehicle. These types of connectors or nipples are often characterised by being precise shapes, thin thicknesses (even less than 2 mm) and with a very exacting precision and/or clearance in the joining area with the main body.

To obtain a hollow main body, a conventional extrusion/blow-moulding process is typically used while obtaining the other connectors attached to the main body, such as nipples, lugs, pipettes, including sensors, is performed in further steps by means of injection moulding, cutting processes etc.

In order to get the end product, a physical connection between the main body and the different connectors is required. This connection is made subsequently to the single part manufacturing process and by using supplementary processes, such as welding, manual clipping, etc.

In general, the type of aforementioned parts, obtained at various stages of the manufacturing process, have a substantial uncertainty in relation to the quality of the finished product, leading to an undesirably high number of rejects of the product due to the poor robustness of the process, which is linked to manual tasks and imperfect processes (welding and bonding), a fact that is particularly accentuated when the type of plastic to be used is of the soft type with a hardness of between Shore 5 and Shore 65.

Such flaws in the end product are often associated with defects at the joining of the nipples associated with the main duct.

In addition, another equally important drawback is the fact that the current manufacturing method involves a high cost arising, on the one hand, from the need for tools to perform the three processing processes (extrusion blow-moulding, mould injection and tooling intended for the joining of the multiple parts) and, on the other hand, the high cycle times due to each of the three manufacturing processes being completely independent from each other.

Several techniques aimed at resolving the aforementioned problems in the state of the art are known to the applicant. Such techniques can be essentially summarised using three methods:

1) Traditional method: This involves obtaining the main body of the duct by extrusion blow-moulding and the nipples by injection, in tooling and completely independent processes. In this way, once the two geometries have been obtained, they are joined by means of a welding process (hot plate, ultrasounds, etc.) which requires a machine and a specific tool for this part of the process. The main problem with this method is the increased cost resulting from the individual costs of the manufacturing subprocesses, quality control of the subprocesses, logistics of the actual process, greater need for floor space, cost of poor quality, etc., in addition to the problems arising from the parts not adequately supporting the service life for which they have been designed, especially when the plastic used has a hardness of between Shore 5 and Shore 65.

2) Integrated method: It is a variant of the above method, consisting of first manufacturing the nipple by injection and arranging it inside the mould of the extrusion blow-moulding process like an insert, such that the polymer would brace the part or insert during blowing such that the nipple remains fixed to the hollow main body obtained in the second process. The problem with this method is that a third external process is required, which internally communicates the nipple and the hollow main body. In addition, as the joining between the two geometries is done physically or by mechanical interference and not when hot (as the nipple has been produced in a separate previous step), the mechanical performance of said joining and flexibility in respect of the design are dramatically reduced, a fact which is greatly exacerbated when the material used has a hardness of between Shore 5 and Shore 65.

3) Method of extrusion blow-moulding and integrated injection: This relates to the technique of extrusion blow-moulding and injection in the same tool, but sequentially. This method is not applicable when the material used has a hardness of between Shore 5 and Shore 65 as the over pressure from the injection process on the geometry obtained by blowing deforms it making it invalid for final use.

In this regard, the U.S. Pat. No. 5,198,174 describes obtaining additional radial supports for a tube from the application of an overmoulding process which consists of a first phase of production of the hollow tube by blow-moulding. Subsequently, the mould is modified to a second arrangement, and material is supplied thereto. Finally, the mould insert is modified to a third position which causes the material to be pressurised and form the embedded radial portion in the first previously blown portion.

Spanish patent no. ES 2104846 which discloses an integrated manufacturing process for the same type of components is also known. This process involves a first blow-moulding step in order to obtain the hollow body, the modification of the mould and the subsequent step of injecting a number of tabs affixed to the first body.

On the other hand, U.S. Pat. No. 6,793,870 and U.S. Pat. No. 5,266,262 refer to both processes of joining two components made from plastic material such that the hollow component was obtained in a first process. Subsequently, this formed part is inserted into a second mould where the process for obtaining the second component takes place, such that during the second process, a joining between both components is created.

Nonetheless, in spite of the advantages that the aforementioned processes may have in respect of the conventional manufacturing process, these also present a number of drawbacks:

They are not suitable for producing tubes less than 2 mm thick as the pressure in the second overmoulding process deforms the hollow main body.

They can be used in very technical materials (PA, PA6, PA66, PPS, PET, PBT, PEEK, etc.) usually reinforced, therefore not being suitable for processing other materials, such as soft thermoplastic elastomers, PP, PE or EPDM with a hardness of between Shore 5 and Shore 65.

The cycle time is high (about 30% higher than in traditional processes), due to it being the only way to minimise deformation during the process of filling during the over moulding phase, but which, on the other hand, affects the internal compacting of the manufactured part which makes it impossible to get a proper polymer structure. In particular, this aspect affects the final quality of the part as the overmoulded part is always aligned to the radial and/or axial axis of the hollow body.

The methods described above are not suitable for obtaining completely hollow parts and components, main body and protuberances, in one single manufacturing stage. They must always have an external mechanism that links the two cavities, whereas the system and method proposed here, the component or part obtained, is obtained completely unified in and during the same manufacturing process.

DESCRIPTION OF THE INVENTION

This invention has been developed with the aim of providing a moulding method and system which resolves the aforementioned drawbacks, further providing other additional advantages that will be apparent from the description detailed hereinafter.

It is therefore an object of this invention to provide a method for producing air ducts, in particular from plastic material, especially soft plastic material, with a hardness of between Shore 5 and Shore 65, of the type comprising an inner hollow main body provided with at least one protuberance or nipple that projects from the outer wall of said body, obtaining a specific single mould comprising at least two half-moulds, in order to obtain an air duct of the type described in a single method comprising three steps consisting of:

a) Injection moulding of at least one hollow protuberance or nipple from soft plastic material with a hardness of between Shore 5 and Shore 65 inside the first mould cavity defined by said half-moulds and a cylindrical internal device;

b) Displacement of the internal device which confers the internal volume of the protuberance or nipple from step a) into a second cavity arranged in the same mould as step a), said second cavity being positioned adjacent to the first cavity, the inner cavities of the main body and the protuberance or nipple intersecting and communicating, and c) Blow-moulding of the main body from a mouldable plastic-material parison with a hardness of between Shore 5 and Shore 65 inside the second cavity, wherein said protuberance or nipple is supported by locking elements movable perpendicularly relative to the central axis of said protuberance or nipple.

Thanks to these characteristics, a reduction in manufacturing costs is obtained in the production of plastic parts, of the type described above, due to the integration of the moulding processes of the various parts that make up the part, and an increase in the quality of the finished product in terms of the mechanical strength in the areas where the fasteners are joined to the part that has been obtained by blow-moulding. The method described also enables hollow tubular bodies less than 2 mm thick to be obtained.

Protuberance refers to that solid area or part, namely, that is devoid of a through-hole projecting outwards relative to the outer wall of the main body.

It is another aspect of the invention herein to provide said mould for producing air ducts from soft plastic material with a hardness of between Shore 5 and Shore 65 to mould a part formed by a portion with an internally hollow section or main body and at least one second additional part known as a protuberance or nipple attached laterally and exteriorly relative to the first part, comprising at least two half-moulds and a cylindrical internal device positioned between the two half-moulds, said half-moulds and said internal device defining at least a first cavity to form the additional second portion that is linked with an inlet area made of fluid material resulting from a moulding process by injection using a nozzle, a chamber or the injection screw itself and a second elongated cavity to form the internally hollow portion positioned adjacent the first cavity by means of blow-moulding, and a number of movable locking elements located between the two cavities that can move perpendicularly with respect to the central axis of the protuberance or nipple such that said protuberance or nipple can be fixed during the shaping of the main body.

Preferably, the locking elements comprise a movable mechanism by means of a slide, skid or airlock for separating the first and second cavities, the joining having a step-shaped or dovetail geometry ensuring the joining of both materials.

Said internal device is movable along the central axis of the protuberance or nipple, such that the main body and said protuberance or nipple come into contact to shape the part.

Other characteristics and advantages of the method, object of the invention herein, will become apparent from the description of a preferred, although not exclusive embodiment, which is illustrated by way of non-limiting example in the drawings appended, in which:

BRIEF DESCRIPTION OF THE DRAWINGS

FIG. 3—Perspective view of a portion of an air duct made from plastic material resulting after the third step.

DESCRIPTION OF A PREFERRED EMBODIMENT

Figure 1:
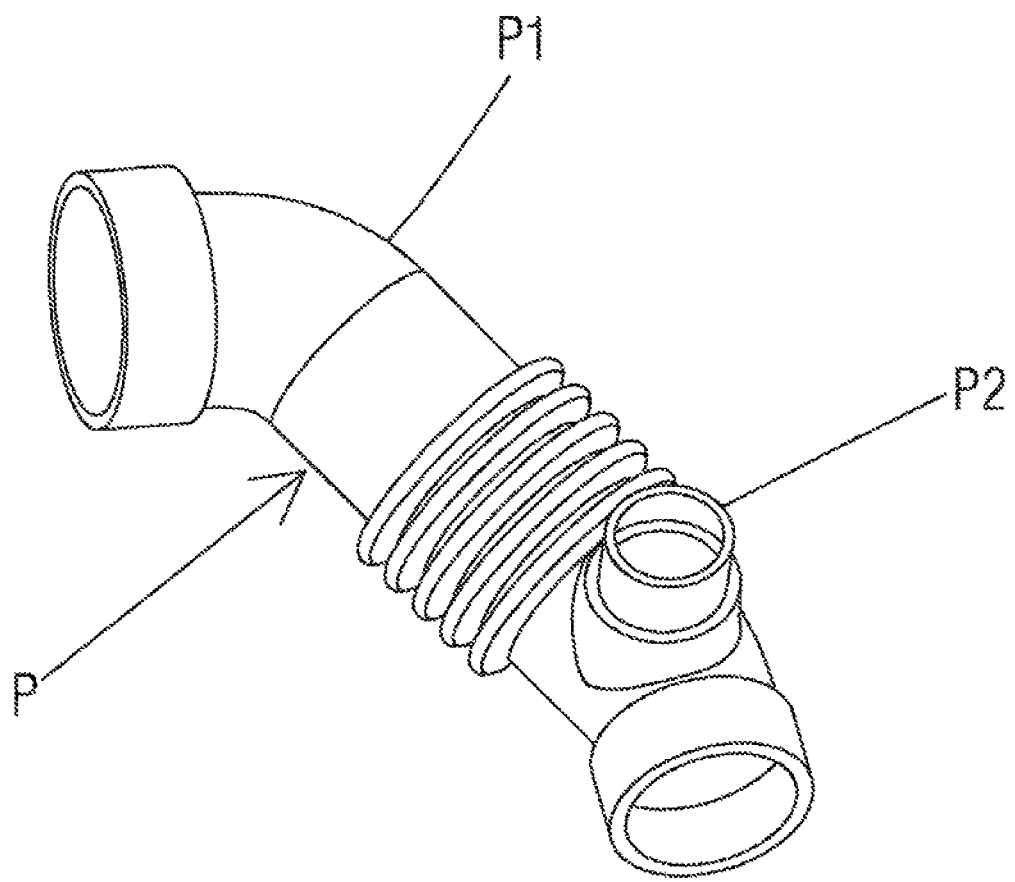
FIG. 1—Perspective view of an air duct made from plastic material obtained from the manufacturing method according to the invention herein.

The method for producing parts from plastic material, especially soft plastic material with a hardness of between Shore 5 to Shore 65, is especially intended for producing air ducts (P) for the automotive sector, which essentially comprise an internally hollow main body (P1), for example in form of a tube provided with at least one protuberance or nipple (P2) projecting from the outer wall of the hollow main body (P1), as illustrated in FIG. 1.

As further illustrated more clearly in FIG. 2, during a first stage in the method, the injection-moulding at high pressure of an internally hollow protuberance or nipple (P2) made from plastic material is conducted inside a first cavity (1) defined by two half-moulds (M1, M2) and an inner cylindrical device (6), which form part of a mould (M) which is described hereinbelow. In this first step, the sealing of the half-moulds (M1, M2), and the insertion of material is initially conducted via a nozzle, a chamber or the actual injection screw (2) of a known type, for the plastic material to exit in a liquid state at a predetermined melting temperature. After this, said half-moulds (M1, M2) are opened by moving them perpendicularly to the central axis of the protuberance or nipple (P2), said protuberance or nipple (P2) being attached on the internal device (6).

In a second step, to facilitate the formation of the part (P), the internal device (6) moves along the central axis of the protuberance or nipple (P2) towards a second cavity (3) arranged in the same mould (M) of the first step, said second cavity (3) being positioned adjacent to the first cavity (1). It is envisaged that the main body (P1) will be configured in said second cavity (3).

Figure 2:
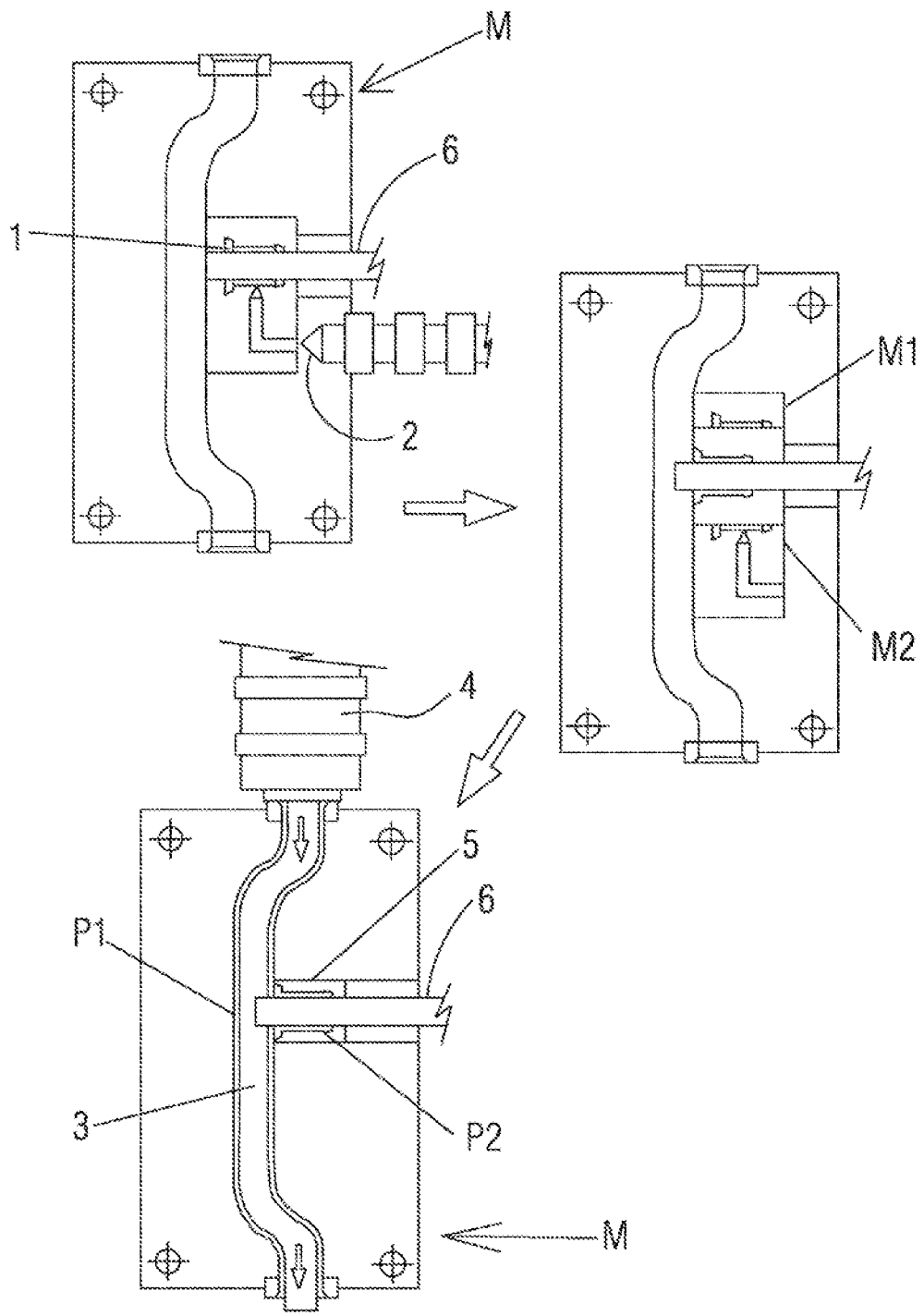
FIG. 2—Schematic elevation view in sequence the various steps of the manufacturing method of the invention.

Subsequently, as shown in FIG. 2, in a third step and after a predetermined time period, the hollow main body (P1) is blow-moulded from a mouldable plastic-material parison inside the second cavity (3). In this manner, the protuberance or nipple (P2) remains around the main body (P1) in a tubular shape. The protuberance or nipple (P2) is positioned firmly during this step by means of both locking elements (5) which move perpendicularly to the central axis of the protuberance or nipple (P2).

In said third step, plastic material is applied in a liquid state and at a predetermined melting temperature and thereafter air is blown inside the second cavity (3) by blowing means (4) of a known type, which are not described herein as they are not the object of the invention.

It should be noted that the movement of the internal device (6) is synchronised with the cycle time of the two moulding steps, namely, with the first and third steps.

Finally, and following a cooling period, the part (P) of the mould (M) is ejected with the help of ejectors, a manufacturing cycle for the next part beginning once again.

It is possible that the overmoulded protuberance or nipple (P2) is detached from the radial and/or axial axes of the hollow body (P1), and may have arrangements in any angle on the surface of the hollow body (P1).

Said mould (M) has a second inner cavity (3) designed to make the main body (P1) internally hollow with an elongated shape, and at least a first cavity (1) intended for the protuberance or nipple (P2), with a specific shape depending on the geometry of said protuberance or nipple (P2) to be moulded. FIG. 3 shows a view of a portion of a part (P) in which the geometry of the joining between the protuberance or nipple (P2) and the main body (P1) is illustrated, which is advantageously of the step or dovetail type, ensuring the permanent joining between both elements.

In respect of the single mould (M) used in the method described, it comprises two half-moulds (M1, M2) of metal that can be coupled to each other and are associated with known opening and closing means, and an internal device (6) responsible for conferring the hollow inner volume to the protuberance or nipple (P2).

The details, shapes and dimensions and other accessory elements as well as the materials used in the manufacture of the method of the invention may be conveniently replaced by others which are technically equivalent and do not depart from the essential nature of the invention or from the scope defined by the claims provided hereinafter.

The invention claimed is:

1. A method for producing air ducts from plastic material with a hardness of between Shore 5 and Shore 65, the air ducts including an internally hollow main body provided with at least one protuberance or nipple, also internally hollow, that projects from the outer wall of the main body, the main body and the protuberance or nipple communicating with each other and forming a single inner volume at the end of the method, the joining between the main body and the protuberance or nipple, forming said single inner volume being obtained by the method comprising the steps of:
   a) injection-moulding of at least one internally hollow protuberance or nipple from plastic material with a hardness of between Shore 5 and Shore 65 inside a first cavity defined by at least two half-moulds of a mould and an inner cylindrical device located between said half-moulds, by providing the material on the perpendicular side or at least non-parallel or aligned with the central axis of the protuberance or nipple which confers its inner volume;
   b) displacement of the inner cylindrical device which confers the inner volume of the protuberance or nipple from step a) into a second cavity arranged in the same mould as step a), said second cavity being positioned adjacent to the first cavity, the inner cavities of the main body and the protuberance or nipple intersecting and communicating, and
   c) low-moulding the main body from a mouldable plastic-material parison with a hardness of between Shore 5 and Shore 65 inside the second cavity, wherein said protuberance or nipple is supported by locking elements movable perpendicularly relative to the central axis of said protuberance or nipple.

2. A mould for producing air ducts from plastic material, with a hardness of between Shore 5 and Shore 65 to mould a part formed by an internally hollow main body and at least one additional protuberance or nipple adhered laterally and exteriorly in respect of the main body, wherein it comprises at least two half-moulds and a cylindrical internal device located between said half-moulds, and a number of movable locking elements located between the two cavities, said half-moulds and said inner cylindrical device define at least one first cavity to form the protuberance or nipple, of cylindrical geometry, hollow inside and of uniform thickness, by means of an injection-moulding process, said first cavity being linked with an inlet area made of fluid material via a nozzle, a chamber or the injection screw itself, further comprising a second elongated cavity to form the main body, by using blow-moulding and a number of movable locking elements located between the two cavities, said locking elements being able to move perpendicularly with respect to the central axis of the protuberance or nipple such that said protuberance or nipple can be fixed during the shaping of the main body and formed by a mechanism that can move by using a slide, skid or airlock for separating the first and second cavities, the joining having a step-shaped or dovetail geometry ensuring the joining of both materials.

3. The mould according to claim 2, wherein said inner cylindrical device is movable along the central axis of the protuberance or nipple, such that the main body and said protuberance or nipple come into contact to shape the part.

* * * * *